United States Patent [19]

Benevelli et al.

[11] Patent Number: 5,226,472
[45] Date of Patent: Jul. 13, 1993

[54] MODULATED TEMPERATURE CONTROL FOR ENVIRONMENTAL CHAMBER

[75] Inventors: John A. Benevelli, Burbank; Michael L. Murray, Franklin Park; Duane C. Drinkwine, Berwyn, all of Ill.

[73] Assignee: Lab-Line Instruments, Inc., Melrose Park, Ill.

[21] Appl. No.: 792,705

[22] Filed: Nov. 15, 1991

[51] Int. Cl.5 .............................. F25B 29/00
[52] U.S. Cl. ........................ 165/30; 62/217
[58] Field of Search .............. 165/30, 14; 62/217

[56] References Cited

U.S. PATENT DOCUMENTS

| | | | |
|---|---|---|---|
| 3,698,204 | 9/1972 | Schlotterbeck et al. | 62/217 X |
| 3,914,952 | 10/1975 | Barbier | 62/217 X |
| 4,494,184 | 1/1985 | Crevel | 165/30 X |
| 4,556,528 | 1/1986 | Helmle et al. | 165/26 |
| 4,663,725 | 5/1987 | Truckenbrod et al. | 364/505 |
| 4,784,213 | 11/1988 | Eager et al. | 165/30 X |
| 4,789,025 | 12/1988 | Brandemuehl et al. | 165/30 |
| 4,928,750 | 5/1990 | Nurczyk | 165/2 |

Primary Examiner—Stephen M. Hepperle
Attorney, Agent, or Firm—Emrich & Dithmar

[57] ABSTRACT

A temperature-controlled environmental chamber includes a resistance heater controlled by a solid state relay and a refrigeration unit including an electronically controlled suction throttling valve connected in the refrigerant line between the evaporator and the inlet of the compressor. A temperature controller senses the temperature in the chamber and compares it to a set point temperature and outputs a pulse-width modulated control signal indicative of the difference between the two temperatures. The control signal directly controls the heater relay for substantially continuous variation between minimum and maximum heating conditions. The control signal is converted to an analog signal for controlling the throttling valve of the refrigeration unit for substantially continuous variation between maximum and minimum cooling conditions, so that the amount of cooling provided is inversely proportional to the amount of heating provided. A hot gas bypass is provided for maintaining a minimum input pressure on the condenser and a refrigerant bypass is provided to maintain the input temperature of the compressor below a predetermined maximum.

20 Claims, 3 Drawing Sheets

MODULATED TEMPERATURE CONTROL FOR ENVIRONMENTAL CHAMBER

BACKGROUND OF THE INVENTION

1. Field of the Invention

The present invention relates to temperature-controlled spaces, such as environmental chambers and, in particular, to a control system for controlling the temperature of such a space.

2. Description of the Prior Art

It is often necessary to maintain the temperature of an enclosed space at a predetermined temperature or in a predetermined temperature range. Such temperature control is necessary, for example, in the cargo spaces of vehicles, cargo containers, environmental chambers and the like. Such temperature control systems typically include a heating unit and a refrigeration unit and a control system for monitoring the ambient temperature in the served space and comparing it to a set point temperature and controlling the heating and/or cooling output as necessary to maintain the set point temperature.

Various types of control schemes have been used for different applications, but many of these schemes do not provide a very precise temperature control. One type of system simply maintains both the heating unit and the refrigeration unit on all the time and controls the temperature by controlling the mix of heated and cooled air. Other systems leave the heating unit on all the time but control an associated blower to control heated air flow. Such systems are inherently inefficient. Furthermore, systems which control air flow mixtures require dampers and associated ductwork.

A variant type of system maintains the refrigeration system on all the time and controls temperature by turning the heating unit on and off, as necessary. This improves efficiency, but the system is relatively slow to react, since the refrigeration unit must constantly overcome the effect of the heating unit.

Other types of systems control temperature by cycling the refrigeration unit on and off, as needed. This involves the use of cycling solenoid valves which can be relatively noisy in operation and do not provide very precise temperature control.

SUMMARY OF THE INVENTION

It is a general object of the present invention to provide an improved temperature control system for a served space which avoids the disadvantages of prior control systems while affording additional structural and operating advantages.

An important feature of the invention is the provision of apparatus for controlling the air temperature of a served space by simultaneous control of heating and refrigeration units in opposite directions.

In connection with the foregoing feature, a still further feature of the invention is the provision of an apparatus of the type set forth which controls the heating and refrigeration units substantially continuously between minimum and maximum heating or cooling conditions.

In connection with the foregoing features, another feature of the invention is a provision of apparatus of the type set forth which utilizes the same control signal for effecting control of both the heating and refrigeration units.

Yet another feature of the invention is the provision of an apparatus of the type set forth, which effects control of the refrigeration unit by modulating the flow of refrigerant through the evaporator coils.

Another feature of the invention is the provision of a method for controlling the air temperature of a served space, such that the amount of cooling provided is inversely proportional to the amount of heating provided.

These and other features of the invention are attained by providing apparatus for controlling the air temperature of a served space which is equipped with a heating unit and a refrigeration unit, the apparatus comprising: temperature sensing means for sensing the temperature in the served space, comparator means for comparing the sensed temperature to a predetermined set point temperature and generating a control signal indicative of the difference between the two temperatures, and control means coupled to the comparator means and to the heating unit and the refrigeration unit and responsive to the control signal for controlling the operation of the heating unit and the refrigeration unit in a push-pull manner such that the amount of cooling provided is inversely proportional to the amount of heating provided.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
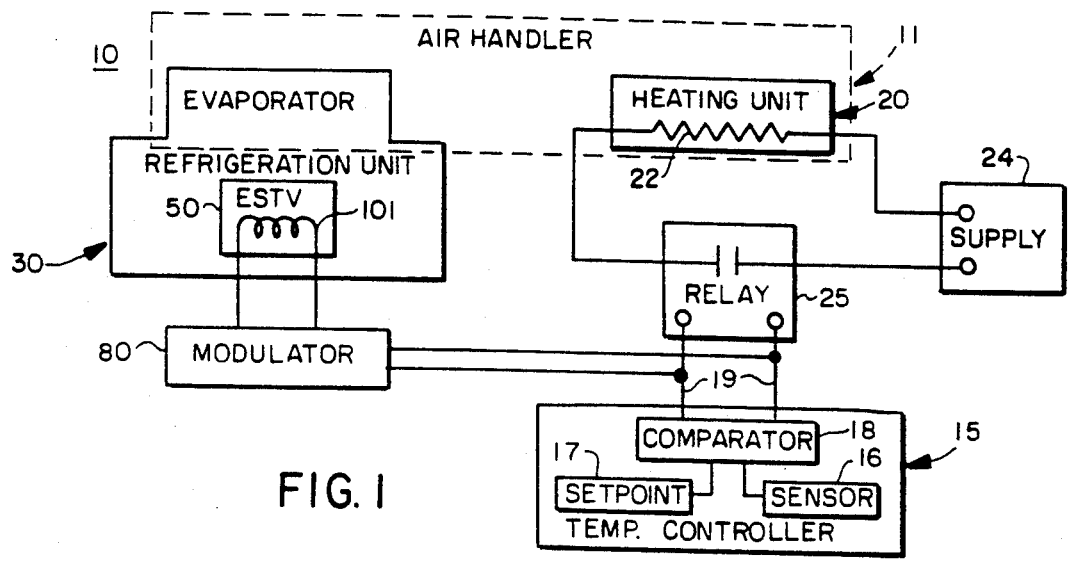
FIG. 1 is a partially schematic and partially functional block diagrammatic illustration of the temperature control system of the present invention.

Referring to FIG. 1, there is illustrated a temperature control system, generally designated by the numeral 10, constructed in accordance with and embodying the features of the present invention.

The temperature control system 10 is of the type which may be used for controlling the temperature in a served space, such as an environmental chamber, and includes an air handler for controlling the flow of air through the served space. The temperature control system 10 includes a temperature controller 15, which may be a microprocessor-controlled device, such as that sold by Eurotherm Corporation under the model number 808. The temperature controller 15 includes a sensor 16 for sensing the temperature of the air in the served space, a set point control unit 17 for setting the predetermined temperature which is to be maintained in the served space, and a comparator 18 which receives the inputs from the sensor 16 and the set point control unit 17 and generates on output terminals 19 a pulse-width-modulated ("PWM") signal which is indicative of the difference between the set point temperature and the actual sensed temperature.

The temperature control system 10 also includes a heating unit or heat source 20 and a refrigeration unit or cold source 30 for, respectively, heating and cooling the air in the served space. The heating unit 20 preferably includes a resistance heater 22 which is disposed in the air stream of the air handler 11 of the served space and is connected across an associated power supply 24 through the normally-open contacts of a solid state relay 25. The control terminals of the relay 25 are connected to the output terminals 19 of the temperature controller 15 for closing the relay contacts when the PWM output signal from the comparator 18 is high, as will be explained more fully below.

Figure 2:
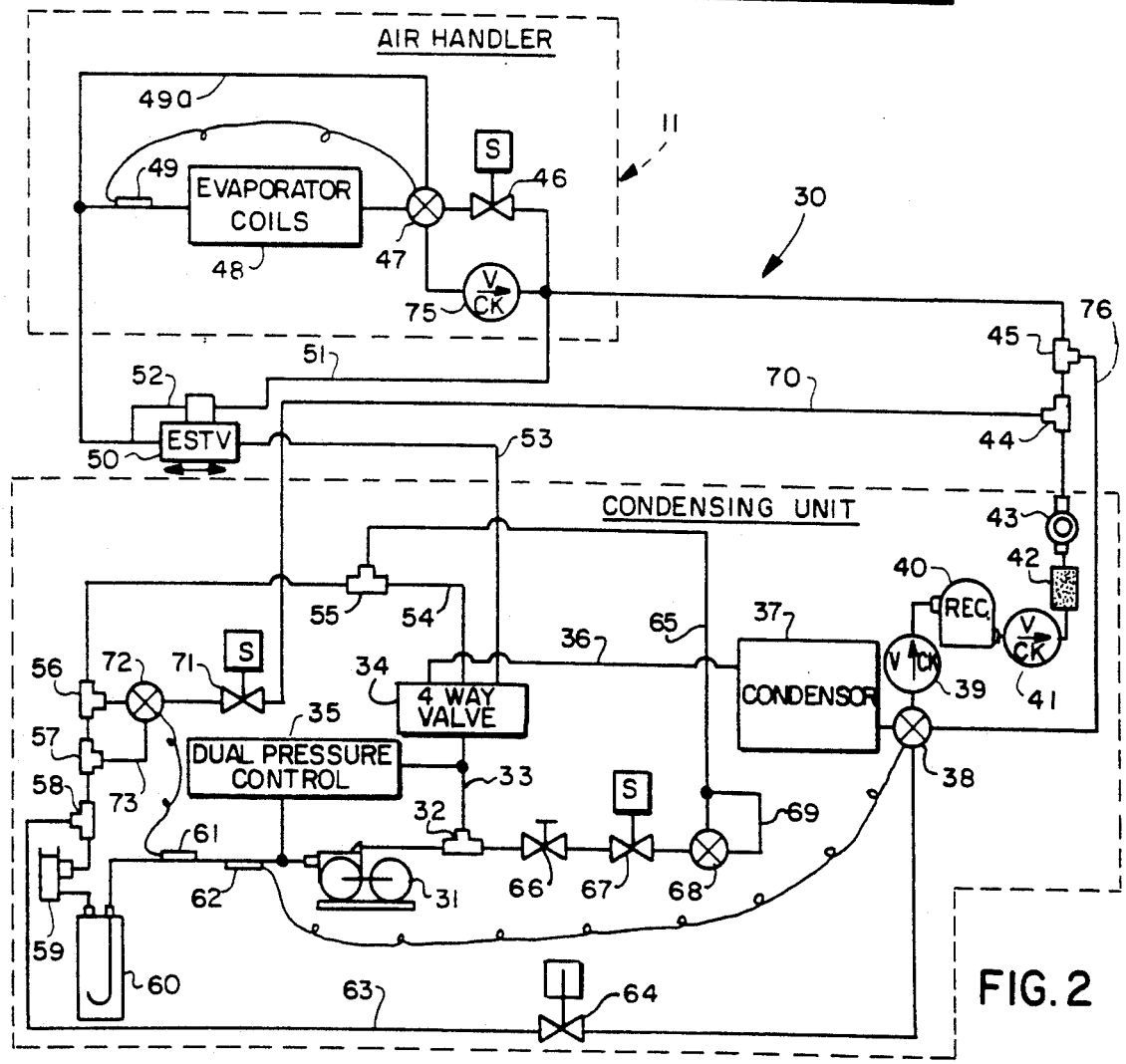
FIG. 2 is a fluid-flow schematic diagram of the refrigeration unit of the temperature control system of FIG. 1.

Referring also to FIG. 2, the refrigeration unit 30 is largely of conventional construction, including a compressor, a condenser and an evaporator interconnected by associated conduits. More specifically, the refrigeration unit 30 includes a compressor 31, the output of which is coupled through a T-fitting 32, one branch of which is coupled via a refrigerant line 33 to a first port of a four-way valve 34. The line 33 is coupled to the input of the compressor 31 through a dual pressure control unit 35 which monitors the pressures at the input and the output of the compressor 31 in a known manner. A second port of the four-way valve 34 is coupled by a refrigerant line 36 to the input of a condenser 37, the output of which is coupled through the bypass port of a thermal expansion valve 38 and a check valve 39 to a receiver 40. The output of the receiver 40 is coupled through another check valve 41, a filter drier 42, a sight glass 43, a pair of T-fittings 44 and 45, a solenoid valve 46 and a thermal expansion valve 47 to the input of evaporator coils 48, which are located in the air stream of the air handler 11 of the served space. An external equalization line 49a is provided around the evaporator coils 48 between the output thereof and the thermal expansion valve 47. Also located on the output line from the evaporator coils 48 is a temperature sensing bulb 49 for controlling the operation of the thermal expansion valve 47 in a known manner.

The output of the evaporator coils 48 is also coupled to the input of an electronically controlled suction throttling valve ("ESTV") 50, which is a normally-open, pilot-operated, solenoid-controlled valve, which may be of the type sold by Sporlan Valve Company under the trade designation "CDA". The ESTV 50 has a pilot assembly which is coupled via a high-pressure pilot line 51 to the input of the solenoid valve 46 and a low-pressure pilot line 52 which is coupled to the input of the ESTV 50. The ESTV 50 modulates substantially continuously between fully-open and fully-closed conditions, and operates by responding to the change in magnetic pull of its DC-operated coil. The output of the ESTV 50 is coupled by a line 53 to a third port of the four-way valve 34, a fourth port of which is coupled via a line 54, T-fittings 55, 56, 57 and 58 and a crankcase pressure regulator valve 59 to a suction accumulator 60 which is, in turn, coupled to the input of the compressor 31. Located on the compressor input line are temperature sensing bulbs 61 and 62, the latter controlling the thermal expansion valve 38. An external equalization line 63 i also connected around the compressor 31 between the T-fitting 58 and the thermal expansion valve 38 through a solenoid valve 64.

There is also provided a hot gas bypass line 65 which is coupled between the output and the input of the compressor 31. More specifically, the hot gas bypass line 65 is coupled from the T-fitting 32 through a hand valve 66, a solenoid valve 67 and a capacity valve 68 to the T-fitting 55, an external equalization line 69 being provided for the capacity valve 68. The temperature control system 10 also includes a refrigeration bypass line 70, which is coupled from the T-fitting 44 through a solenoid valve 71 and a thermal expansion valve 72 to the T-fitting 56. The thermal expansion valve 72 is controlled by the temperature sensing bulb 61 and is provided with an external equalization line 73 coupled to the T-fitting 57.

In operation, the hot gas bypass line 65 serves to maintain adequate input pressure to the compressor 31. Thus, for example, when the ESTV 50 reaches a nearly fully closed condition, the pressure at the input of the compressor 31 may drop to a predetermined minimum pressure. This drop in pressure will be sensed by the capacity valve 68 via the line 65 which is coupled to the input of the compressor 31, thereby causing the capacity valve 68 to be opened to bypass hot gas from the output of the compressor 31 back to its input without going through the condenser 37. This maintains the compressor input pressure above the predetermined minimum value for which the capacity valve 68 has been set. If the temperature at the input of the compressor 31 becomes too high, the signal from the sensing bulb 61 will further open the thermal expansion valve 72 to increase the flow of cold refrigerant from the output of the receiver 40 directly to the input of the compressor 31 via the line 70 without going through the evaporator coils 48, thereby to maintain the temperature at the input of the compressor 31 at or below a predetermined maximum temperature.

It will be appreciated that, in normal operation, the compressor 31 is substantially continuously operating. However, if the temperature at the input of the compressor 31 becomes too high or too low, it will be automatically shut off by associated control circuitry (not shown) in a known manner, although the refrigerant bypass line 70, described above, is designed to prevent high-temperature shut off. It will also be appreciated that the compressor 31 is designed to automatically shut off if the input pressure becomes too low or the output pressure becomes too high but, as was indicated above, the hot gas bypass line 65 is designed to prevent low-pressure shut off of the compressor 31.

In normal operation, the refrigerant flow is from the output of the compressor 31 through the line 33, the four-way valve 34, the line 36 and the condenser 37, and thence through the bypass port of the thermal expansion valve 38 and the receiver 40 to the thermal expansion valve 47 and the evaporator coils 48 for cooling the air in the served space. The evaporated refrigerant then flows through the ESTV 50 back through the four-way valve 34, the line 54 and the accumulator 60 to the input of the compressor 31 for repeating the cycle.

It will be appreciated that if the air temperature at the evaporator coils 48 drops below freezing, the water vapor in the served space will freeze on the coil surfaces, so the temperature control system 10 is also designed to operate in a defrost mode. In this event, the four-way valve 34 switches to reverse the flow of refrigerant through the system. More specifically, in the defrost mode, the compressor output line 33 is coupled to the line 53 and the condenser line 36 is coupled to the compressor input line 54. Thus, it will be appreciated that, in the defrost mode, the compressed refrigerant passes through the ESTV 50 and then in a reverse direction through the evaporator coils 48, which act as a condenser, thence through the thermal expansion valve 47 and a check valve 75, which is coupled in parallel with the solenoid valve 46. The refrigerant then flows through a bypass line 76 around the receiver 40 through the thermal expansion valve 38 and in a reverse direction through the condenser 37, which acts as an evaporator, then back through the four-way valve 34 and the line 54 to the input of the compressor 31.

Figure 3:
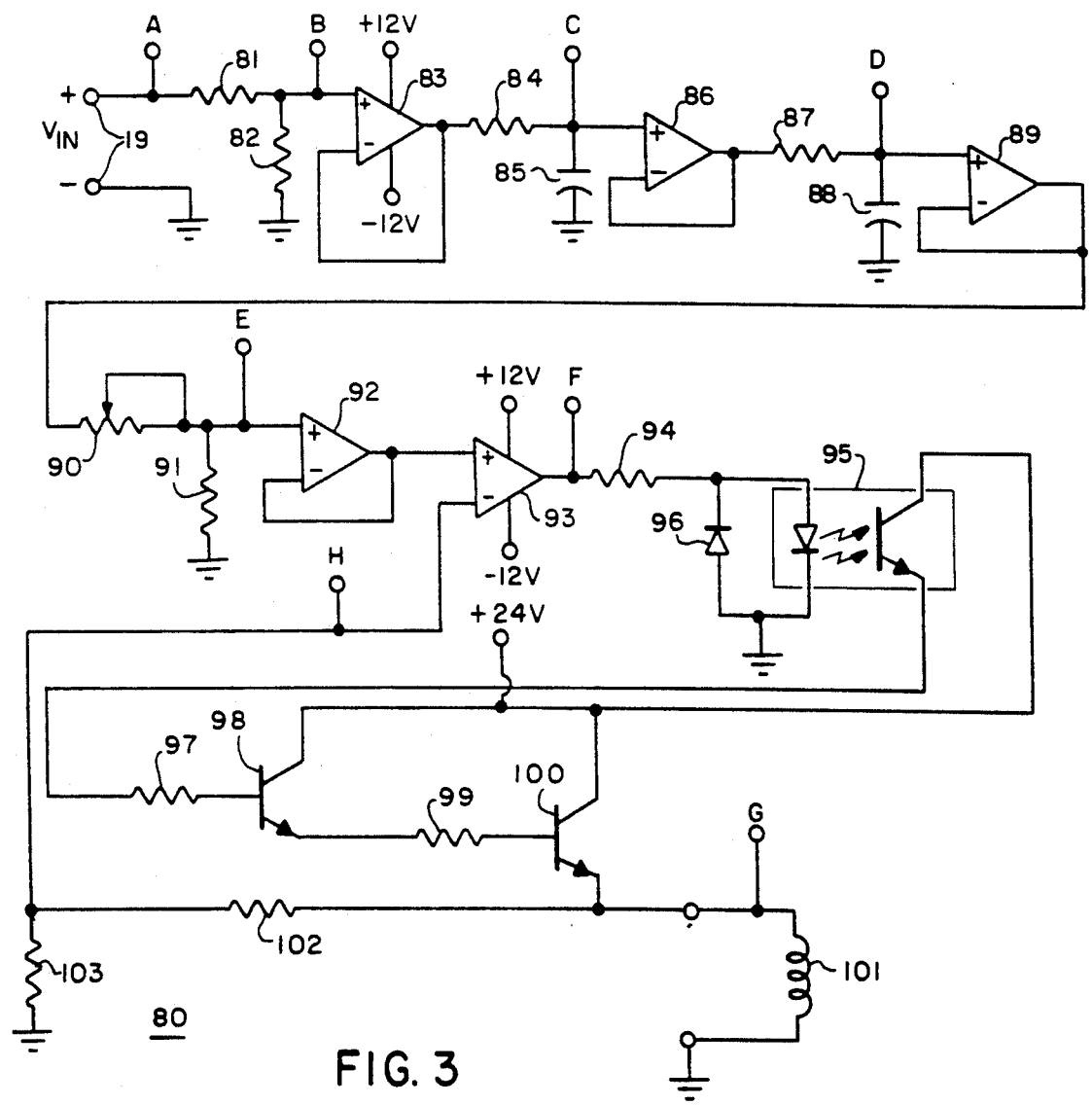
FIG. 3 is an electrical schematic circuit diagram of the modulator of the temperature control system of FIG. 1.

Referring now to FIGS. 1 and 3, the temperature control system 10 also includes a modulator 80 which is coupled between the output terminals 19 from the temperature controller 15 and the ESTV 50. More specifically, the negative input terminal 19 is grounded and the positive terminal is coupled through a test point A and a voltage divider comprising resistors 81 and 82 to ground, the junction between the resistors 81 and 82 being coupled through a test point B to the non-inverting input terminal of a buffer amplifier 83, the output of which is coupled to its inverting input terminal. The output of the buffer amplifier 83 is also coupled through an integrating network including a resistor 84 and a capacitor 85 to ground, the junction between the resistor 84 and the capacitor 85 comprising a test point C and being coupled to the non-inverting input terminal of a buffer amplifier 86, the output of which is coupled to the inverting input terminal thereof. The output of the buffer amplifier 86 is also coupled through a resistor 87 and a capacitor 88 to ground, the resistor 87 and the capacitor 88 forming a further integrator filter, and the junction therebetween being a test point D which is coupled to the non-inverting input terminal of a buffer amplifier 89, the output of which is coupled to the inverting input terminal thereof.

The output of the buffer amplifier 89 is coupled through a potentiometer 90 and a resistor 91 to ground, the potentiometer 90 and the resistor 91 comprising a calibrating voltage divider, the junction therebetween being a test point E which is coupled to the non-inverting input terminal of a buffer amplifier 92, the output of which is connected to the inverting input terminal thereof. The output of the buffer amplifier 9 is also coupled to the non-inverting input terminal of a comparator 93, the output of which is a test point F which is coupled through a resistor 94 to the input of an opto-isolator 95, which includes an LED and a phototransistor in standard fashion. A diode 96 is connected across the input of the opto-isolator 95 to prevent high reverse transient voltages, if present, from damaging the opto-isolator 95. The collector of the phototransistor of the opto-isolator 95 is connected to a +24V supply (not shown). The output of the opto-isolator 95 is taken at the emitter of the phototransistor and is connected through a resistor 97 to the base of a transistor 98, the collector of which is coupled to the +24V supply. The emitter of the transistor 98 is coupled through a resistor 99 to the base of a power transistor 100, the collector of which is also connected to the +24V supply and the emitter of which is connected to the coil 101 of the ESTV 50 at a test point G. The emitter of the power transistor 100 is also coupled through a feedback voltage divider including resistors 102 and 103. One terminal of the resistor 103 is connected to ground and the other (test point H) is connected to the inverting input terminal of the comparator 93.

Figure 4:
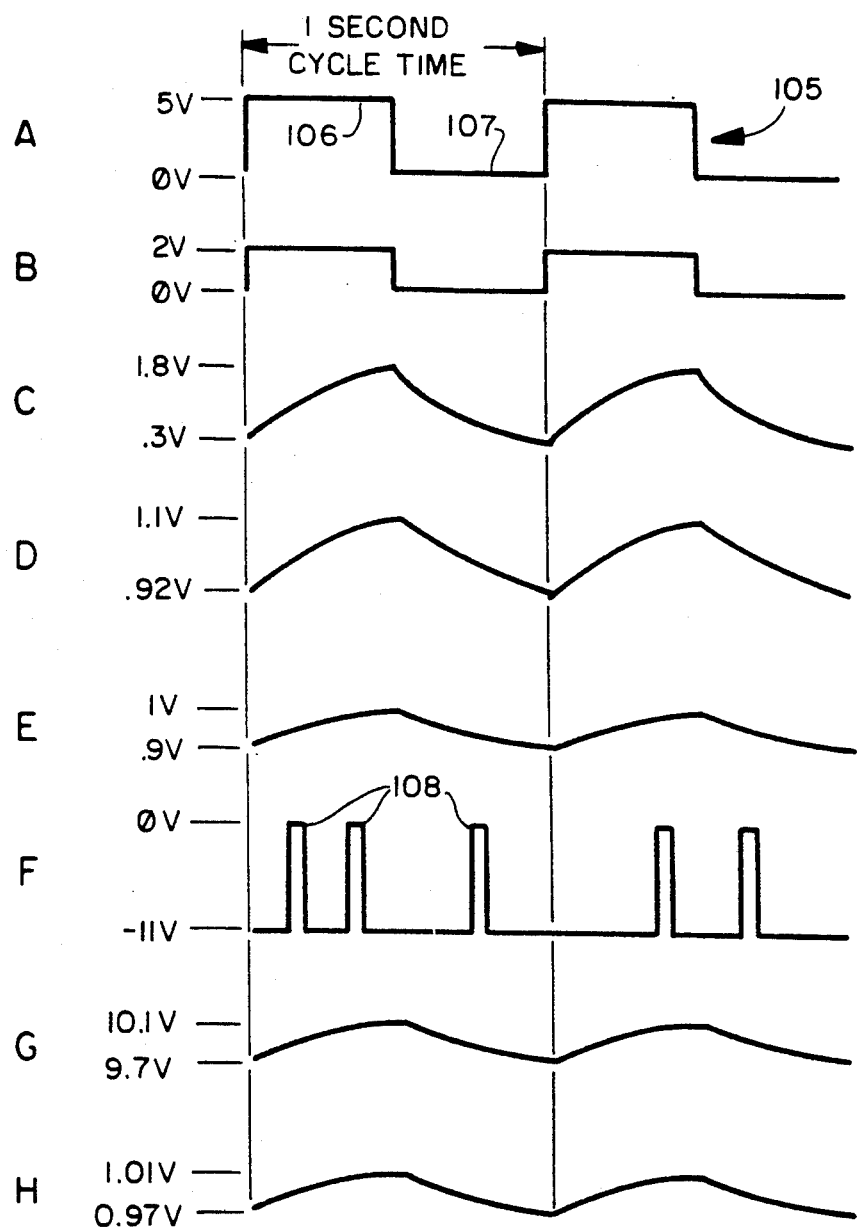
FIG. 4 is a series of waveform diagrams illustrating signals at various points in the circuitry of FIG. 3.

In operation, to effect control of the ESTV 50, the output logic from the temperature controller 15 must be converted from its PWM format to an analog voltage to drive the coil 101 of the ESTV 50. This conversion is effected by the modulator 80, the operation of which will be described with reference to FIG. 4, wherein the waveforms designated A through H, respectively, correspond to the signals at the test points A-H in the circuitry of FIG. 3. More specifically, the output of the temperature controller 15 is a PWM signal 105 (waveform A) which has a high level 106 at substantially +5 volts and a low level 107 at 0 volts and is set to have a period or cycle time of approximately one second between adjacent low-to-high transitions. The signal 105 is illustrated with a 50% duty cycle, for purpose of illustration, but it will be appreciated that the duty cycle may vary between 0 and 100%, depending upon the difference between the sensed temperature in the served space and the set point temperature.

The PWM output from the temperature controller 15 is first applied through the voltage divider comprising the resistors 81 and 82 to scale down the voltage so that it varies between approximately 0 volts and 2 volts (waveform B). This voltage is buffered by the amplifier 83, and appears at its output as the same PWM input but of lesser magnitude. This signal is then integrated by the resistor 84 and the capacitor 85, which preferably have a nominal time constant of approximately 0.33 seconds. The integrated signal (waveform C) is then buffered by the amplifier 86 and again integrated and filtered by the resistor 87 and capacitor 88, which preferably have a time constant of approximately 2.2 seconds. This signal (waveform D) is again buffered by amplifier 89, and is then scaled down by the voltage divider comprised of the potentiometer 90 and the resistor 91, so that the signal will have a voltage of approximately 2VDC when the output of the temperature controller 15 has a 100% duty cycle, i.e., a full-heat output. This scaled signal (waveform E) is again buffered by the amplifier 92 and applied to the comparator 93, the output of which (waveform F) drives the input of the opto-isolator 95. The output of the opto-isolator 95 drives the power transistor 100 to supply current to drive the coil 101 in the ESTV 50 (waveform G). This drive voltage is fed back through the voltage divider comprising the resistors 102 and 103 to the comparator 93 as waveform H.

The value of the voltage divider resistors 102 and 103 are such as to divide the ESTV drive voltage by a factor of 10. This feedback voltage is then compared to the reference or desired voltage (waveform E) and, through this feedback control loop, controls the voltage present at the ESTV coil 101 (waveform G) so that it is always 10 times the reference voltage (waveform E). Thus, when the waveform E is at its maximum 2 volts, the drive voltage for the ESTV will be 20 volts. Accordingly, it will be appreciated that the voltage across the ESTV coil 101 is modulated between 0 volts, which corresponds to the normally fully open condition and 20 VDC which corresponds to a fully closed condition.

The output of the comparator 93 (waveform F) appears as a series of short pulses 108. Thus, it can be appreciated that the output of the comparator 93 is fluctuating on and off. Accordingly, if the feedback voltage (waveform H) drops below the reference (waveform E), the output of the comparator 92 will go high, but this will immediately bring the feedback voltage back up to the reference level, so that the output of the comparator will immediately go back low again. It will be appreciated that the greater the "duty cycle" of the waveform F, i.e., the greater the time that it is high, the higher will be the average analog drive voltage at the ESTV solenoid coil 101 (waveform G), and the more the ESTV 50 will be closed.

In overall operation, when the temperature controller 15 detects a difference between the sensed temperature and the set point temperature, it will change the duty cycle of the PWM output signal 105 accordingly. Thus, if the sensed temperature is too low, the duty cycle of the PWM signal 105 will be increased, thereby effectively increasing the heating output of the heating unit 20. More specifically, whenever the output signal 105 is high, the contacts of the relay 25 will close, turning the heater 22 on. Thus, the greater the duty cycle of the PWM waveform, the greater the percentage of time during each cycle that the heater 22 will be on and, correspondingly, the greater the overall heating output. Thus, it will be appreciated that the heating output from the heating unit 20 can be substantially continuously varied between a minimum heating output, which is substantially 0 when the PWM waveform 105 has a zero duty cycle and the heater 22 is continuously off, and a maximum heating output of substantially 100%, when the PWM waveform 105 has a 100% duty cycle and the heater 22 is continuously on. This variation is illustrated by the curve 110 in FIG. 5.

It is a fundamental aspect of the present invention that the PWM signal 105 which controls the heating unit 20 simultaneously effects a corresponding, but inverse control of the refrigeration unit 30 so that, as the heating output is increased the cooling output is correspondingly decreased, and vice versa. Thus, in the event that the sensed temperature is too low, e.g., the temperature control system 10 will compensate by not only increasing the heating output but also by simultaneously decreasing the cooling output, for more rapidly bringing the temperature of the served space into regulation at the set point temperature.

Figure 5:
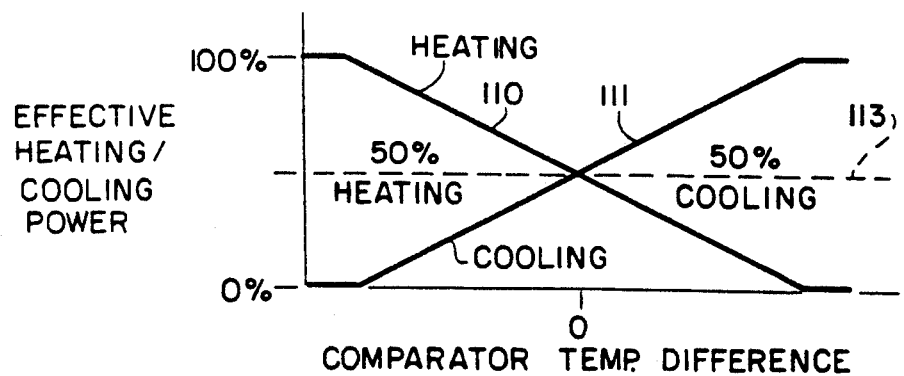
FIG. 5 is a graph illustrating the heating and cooling power outputs of the temperature control system of FIG. 1.

Thus, it will be appreciated that the ESTV 50 is normally in a fully opened condition, accommodating maximum refrigerant flow through the evaporator coils 48 and, accordingly, maximum cooling output. This will correspond to a 0 VDC operating voltage applied to the coil 101 of the ESTV 50. As the voltage applied to the coil 101 increases, the ESTV 50 correspondingly closes, reducing the flow of refrigerant through the evaporator coils 48 and, thereby, correspondingly reducing the cooling output. As can be understood from the foregoing description of the operation of the modulator 80, as the duty cycle of the PWM waveform 105 increases, the DC level of the voltage applied to the coil 101 of the ESTV 50 correspondingly increases to further close the ESTV 50 and correspondingly reduce the cooling output. In like manner, as the duty cycle of the PWM waveform 105 decreases, reducing the heating output, the voltage applied to the ESTV coil 101 also decreases, further opening it to increase the cooling output. This "push-pull" type of operation is illustrated in FIG. 5 wherein it can be seen that a decrease in the heating output curve 110 results in a corresponding increase in the cooling output curve 111. When each of the heating unit 20 and the refrigeration unit 30 are producing about 50% of their maximum output, the curves 110 and 111 intersect substantially along the 50% heating and cooling level 113.

Modern microprocessor-based temperature controllers, such as the Eurotherm Model 808 mentioned above, provide superior PID (proportion-integral-derivative) algorithms for enabling precision proportional throttling back of applied power as the set point temperature is reached, automatic reset to eliminate proportional droop and rate control t correct for set point overshoot. These algorithms have heretofore been used only to control heating. The present invention synchronously modulates cooling inversely proportional to the heater control signal, thereby taking advantage of the PID algorithms for cooling as well as heating, thereby substantially improving corrections to temperature drift from set point in either direction.

From the foregoing, it can be seen that there has been provided an improved temperature control system which effects simultaneous control of a heating unit and a refrigeration unit in a "push-pull" or inverse manner, so that an increase in heating output results in a corresponding decrease in cooling output, and vice versa. Both the heating unit and the refrigeration unit can be controlled in a substantially continuous manner between substantially 0% and substantially 100% output, thereby providing an effective modulated control without the need for cycling either the evaporator or the compressor of the refrigeration unit on or off with the use of mechanical relays, and without having to use dampers and associated ductwork for separately controlling the flow of heated and cooled air. There results an efficient and fast-acting temperature control system which is of relatively simple and economical construction.

We claim:

1. Apparatus for controlling the air temperature of a served space which is equipped with a heat source and a cold source, said apparatus comprising: temperature sensing means for sensing the temperature in the served space, comparator means for comparing the sensed temperature to a predetermined set point temperature and generating a control signal indicative of the difference between the two temperatures, and control means coupled to said comparator means and to the heat source and the cold source and responsive to only said control signal for controlling the operation of the heat source and the cold source in a push-pull manner such that the amount of cooling provided is inversely proportional to the amount of heating provided.

2. The apparatus of claim 1, wherein said comparator means include means for generating a pulse-width-modulated control signal.

3. The apparatus of claim 2, wherein said control means include means for converting said pulse-width-modulated control signal to an analog signal for control of the cold source.

4. The apparatus of claim 1, wherein the cold source includes a condenser and an evaporator and a compressor and conduit means interconnecting them in series relationship for controlling the flow of a refrigerant therethrough, said control means including an electronically controlled suction throttling valve connected in series between said evaporator and said compressor, and means controlling said valve in response to said control signal for varying the flow of refrigerant through said evaporator.

5. The apparatus of claim 1, wherein said control means includes means for effecting substantially continuous control of the heat source between minimum and maximum heating conditions and substantially continuous control of the cold source between maximum and minimum cooling conditions.

6. The apparatus of claim 1, wherein said control means includes heating control means coupled to said heat source for controlling the operation thereof, and refrigeration control means coupled to said cold source for controlling the operation thereof.

7. The apparatus of claim 6, wherein the heat source includes a resistance heater coupled to an associated source of electrical power, said heating control means including a relay for controlling the flow of current from the source of electrical power through said resistance heater, said cold source including an electronically controlled suction throttling valve and means controlling the operation of said valve in response to said control signal.

8. Apparatus for controlling the air temperature of a served space which is equipped with a heat source and a cold source, said apparatus comprising: temperature sensing means for sensing the temperature in the served space, comparator means for comparing the sensed temperature to a predetermined set point temperature and generating a control signal indicative of the difference between the two temperatures, heating control means coupled to said comparator means and to the heat source and responsive to only said control signal for controlling the operation of the heat source in a continuous manner between minimum and maximum heating conditions, refrigeration control means coupled to said comparator means and to the cold source and responsive to only said control signal for controlling the operation of the cold source in a continuous manner between maximum and cooling conditions, whereby when said control signal causes an increase in either heating or cooling it causes a corresponding decrease in the other.

9. The apparatus of claim 8, wherein the heat source includes a resistance heater adapted to be coupled to an associated source of electrical power, said heater control means including a relay connected in circuit with said resistance heater and the associated source of electrical power.

10. The apparatus of claim 9, wherein said comparator means includes means for generating a pulse-width-modulated control signal.

11. The apparatus of claim 8, wherein the cold source includes a condenser and an evaporator and a compressor and conduit means interconnecting them to control the flow of a refrigerant therethrough, said conduit means including an electronically controlled suction throttling valve connected in series between said evaporator and said compressor for controlling the flow of refrigerant through said evaporator.

12. The apparatus of claim 11, wherein said comparator means includes means for generating a pulse-width-modulated control signal, said refrigeration control means including means for converting said pulse-width-modulated control signal to an analog signal for controlling the operation of said valve.

13. The apparatus of claim 11, wherein the cold source further includes first bypass means responsive to the pressure at the input of said compressor dropping to a predetermined minimum value for passing refrigerant from the output of said compressor directly to the input thereof without going through said condenser.

14. The apparatus of claim 13, wherein the cold source further includes second bypass means responsive to the temperature of the refrigerant at the input of said compressor reaching a predetermined maximum value for passing refrigerant from the output of said condenser directly to the input of said compressor without passing through said evaporator.

15. A method for controlling the air temperature of a served space which is equipped with a heat source and a cold source, said method comprising the steps of: sensing the temperature in the served space, comparing the sensed temperature to a predetermined set point temperature, and controlling the output of the heat source and the cold source in accordance with only the amount and direction of separation between the sensed and set point temperatures in a push-pull manner such that the amount of the cooling provided is inversely proportional to the amount of heating provided.

16. The method of claim 15, wherein the heat source is varied substantially continuously between minimum and maximum heating conditions and the cold source is varied substantially continuously between maximum and minimum cooling conditions.

17. The method of claim 15, wherein the cold source is of a type which includes a condenser and an evaporator and a compressor, the cold source control including the step of controlling the flow of refrigerant through the evaporator.

18. The method of claim 17, and further comprising the step of monitoring the pressure at the input of the compressor and passing refrigerant from the output of the compressor to its input without going through the condenser when the compressor input pressure drops to a predetermined minimum value.

19. The method of claim 18, and further comprising the step of monitoring the temperature of the refrigerant at the input of the compressor, and passing refrigerant from the output of the condenser to the input of the compressor without passing through the evaporator when the temperature of the refrigerant at the input of the compressor reaches a predetermined maximum value.

20. The method of claim 15, and further comprising the steps of generating a pulse-width-modulated control signal indicative of the difference between the sensed temperature and the predetermined set point temperature, controlling the operation of the heat source with the control signal, converting the contol signal to an analog signal, and controlling the operation of the cold source with the analog signal.

* * * * *